(12) United States Patent
Farley et al.

(10) Patent No.: US 11,902,106 B2
(45) Date of Patent: Feb. 13, 2024

(54) CLIENT ISOLATION INTERNAL/EXTERNAL FABRIC LCS PROVISIONING SYSTEM

(71) Applicant: Dell Products L.P., Round Rock, TX (US)

(72) Inventors: Douglas Lang Farley, Round Rock, TX (US); Gaurav Chawla, Austin, TX (US); Jimmy Doyle Pike, Georgetown, TX (US); Tommi Salli, Austin, TX (US); Andrew Butcher, Cedar Park, TX (US); Geoffrey A. Reid, Littleton, MA (US); John Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/849,881

(22) Filed: Jun. 27, 2022

(65) Prior Publication Data

US 2023/0421461 A1 Dec. 28, 2023

(51) Int. Cl.
*H04L 41/40* (2022.01)
*G06F 9/48* (2006.01)

(52) U.S. Cl.
CPC .............. *H04L 41/40* (2022.05); *G06F 9/485* (2013.01)

(58) Field of Classification Search
CPC ................................. H04L 41/40; G06F 9/485
See application file for complete search history.

(56) References Cited

U.S. PATENT DOCUMENTS

| 9,075,642 B1* | 7/2015 | Chalmer | G06F 9/45533 |
| 9,674,090 B2 | 6/2017 | Caulfield et al. | |
| 2020/0162282 A1* | 5/2020 | Ashtaputre | H04L 12/4641 |
| 2022/0350767 A1* | 11/2022 | McGraw | G06F 13/4282 |

* cited by examiner

*Primary Examiner* — Sm A Rahman
(74) *Attorney, Agent, or Firm* — Joseph Mencher

(57) ABSTRACT

A client-isolation internal/external fabric LCS provisioning system includes an orchestrator device coupled to a client device via an external fabric, and coupled to resource devices via an internal fabric that is not accessible to the client device via the external fabric. The orchestrator device configures the resource devices to communicate with each other in a manner that satisfies a workload intent for a workload requested by the client device, and presents an LCS provided using the configured resource devices to the client device via the external fabric. When the orchestrator device receives LCS communication(s) directed to the LCS from the client device via the external fabric, it provides instruction(s) to at least one of the resource devices via the internal fabric that are based on the LCS communication and that are configured to cause the at least one of the resource devices to perform function(s) for the LCS.

20 Claims, 11 Drawing Sheets

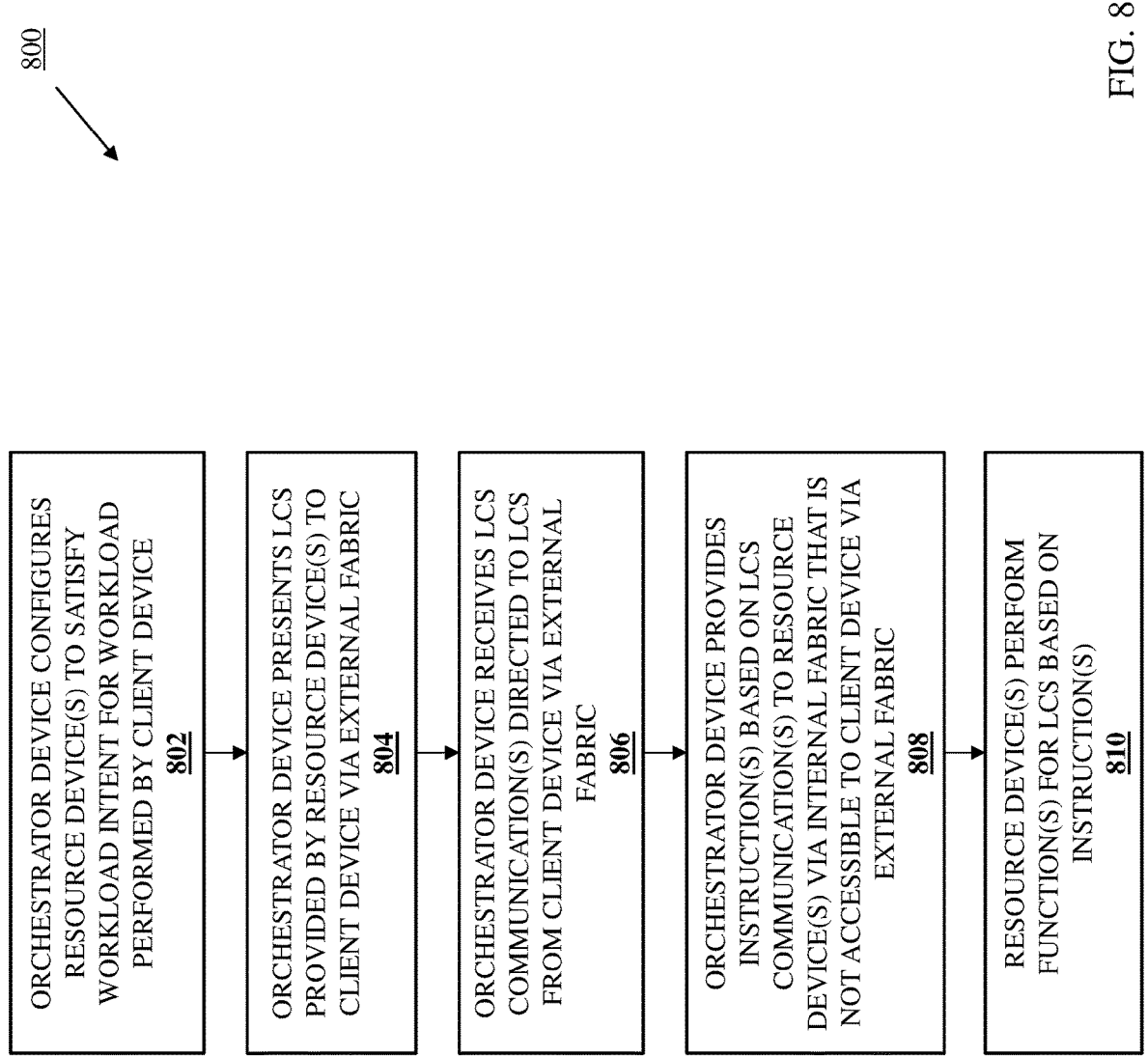

CLIENT ISOLATION INTERNAL/EXTERNAL FABRIC LCS PROVISIONING SYSTEM

BACKGROUND

The present disclosure relates generally to information handling systems, and more particularly to the use of internal and external fabrics to isolate a client device during the provisioning of a Logically Composed System (LCS) via an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, an LCS may be provided using a Bare Metal Server (BMS) system, with a processing system and memory system on a motherboard in the BMS system used to provide an Operating System (OS) for the LCS, and a networking device in the BMS system used to communicate both with a client device that utilizes the LCS and resources devices that provide the LCS. One technique for providing such an LCS may include the use of an orchestrator device in the BMS system that operates to compose the LCS, provide the networking connectivity discussed above, as well as perform other LCS orchestration operations that would be apparent to one of skill in the art in possession of the present disclosure. However, the inventors of the present disclosure have recognized that it is desirable to provide LCSs to client devices while hiding the provisioning of the resource devices that provide those LCSs from those clients devices, preventing direct/full access by those client devices to those resource devices, and/or otherwise making LCSs available to client devices without exposing the resources devices that provide those LCSs, and/or enabling low-level control (e.g., power-on, power-off, reset, etc.) of those resource devices.

Accordingly, it would be desirable to provide an LCS provisioning system that accomplishes the objectives discussed above.

SUMMARY

According to one embodiment, an Information Handling System (IHS) includes a processing system; and a memory system that is coupled to the processing system and that includes instructions that, when executed by the processing system, cause the processing system to provide an orchestrator engine that is configured to: configure a plurality of resource devices to communicate with each other in a manner that satisfies a workload intent for a workload requested by a client device; present, to the client device via an external fabric, a Logically Composed System (LCS) that is provided using the plurality of resource devices that are configured to communicate with each other; receive, from the client device via the external fabric, at least one LCS communication directed to the LCS; and provide, to at least one of the plurality of resource devices via an internal fabric that is not accessible to the client device via the external fabric, at least one instruction that is based on the LCS communication and that is configured to cause the at least one of the plurality of resource devices to perform at least one function for the LCS.

BRIEF DESCRIPTION OF THE DRAWINGS

FIG. 8 is a flow chart illustrating an embodiment of a method for isolating clients via internal/external fabrics when providing an LCS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
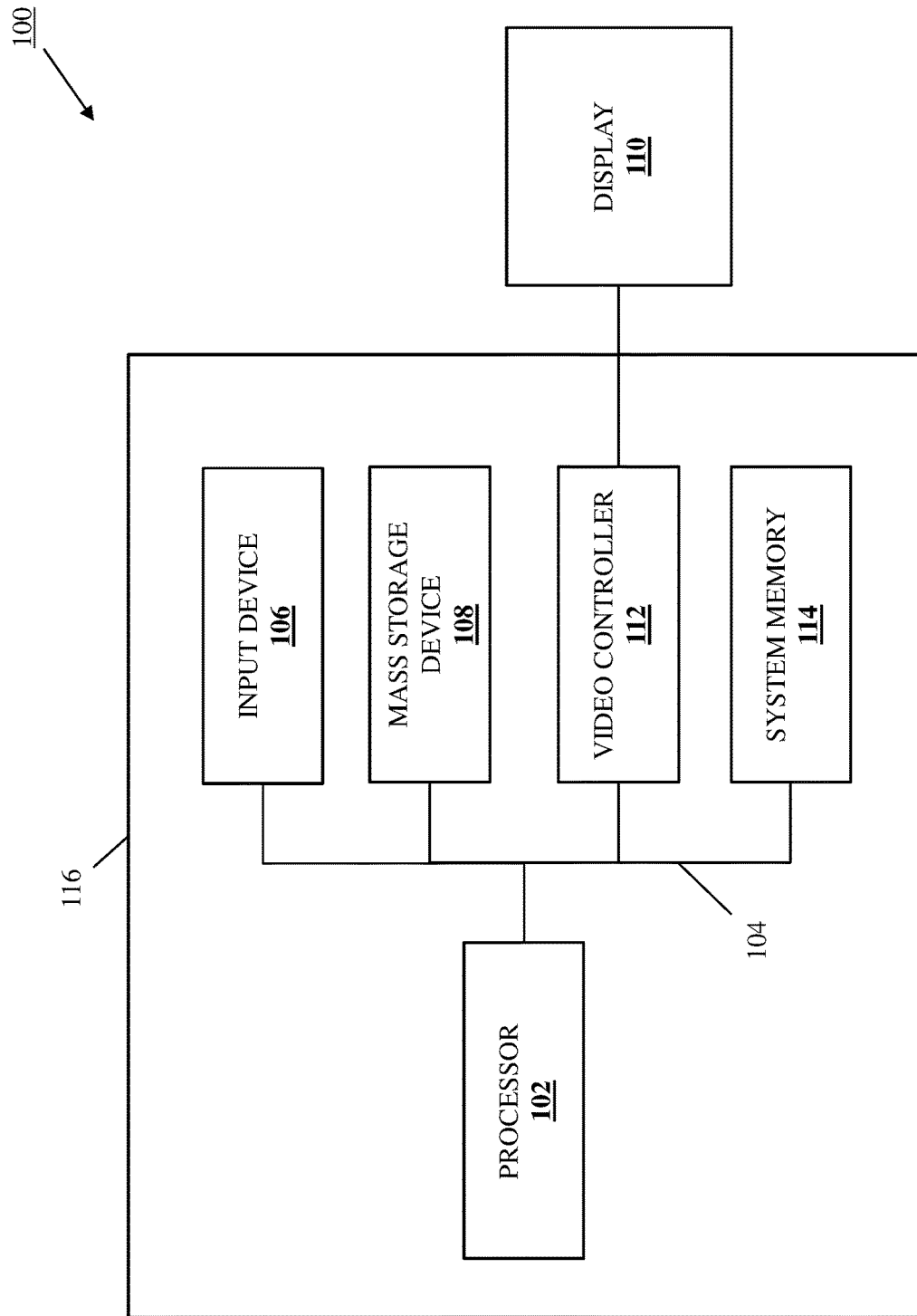
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the client isolation internal/external fabric Logically Composed System (LCS) provisioning systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
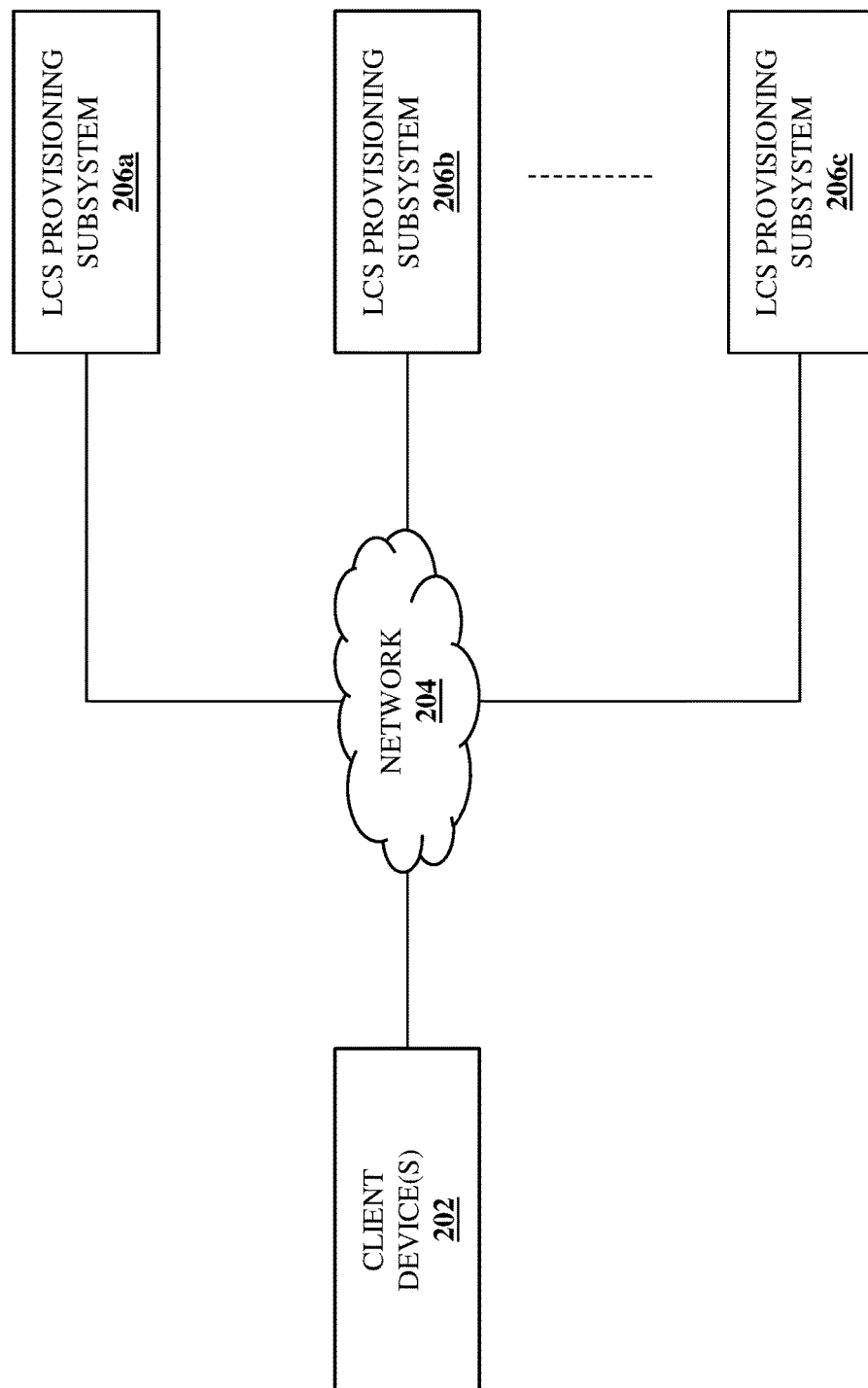
FIG. 2 is a schematic view illustrating an embodiment of an LCS provisioning system.

With reference to FIG. 2, an embodiment of an LCS provisioning system 200 is illustrated that may be utilized with the client isolation internal/external fabric LCS provisioning systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
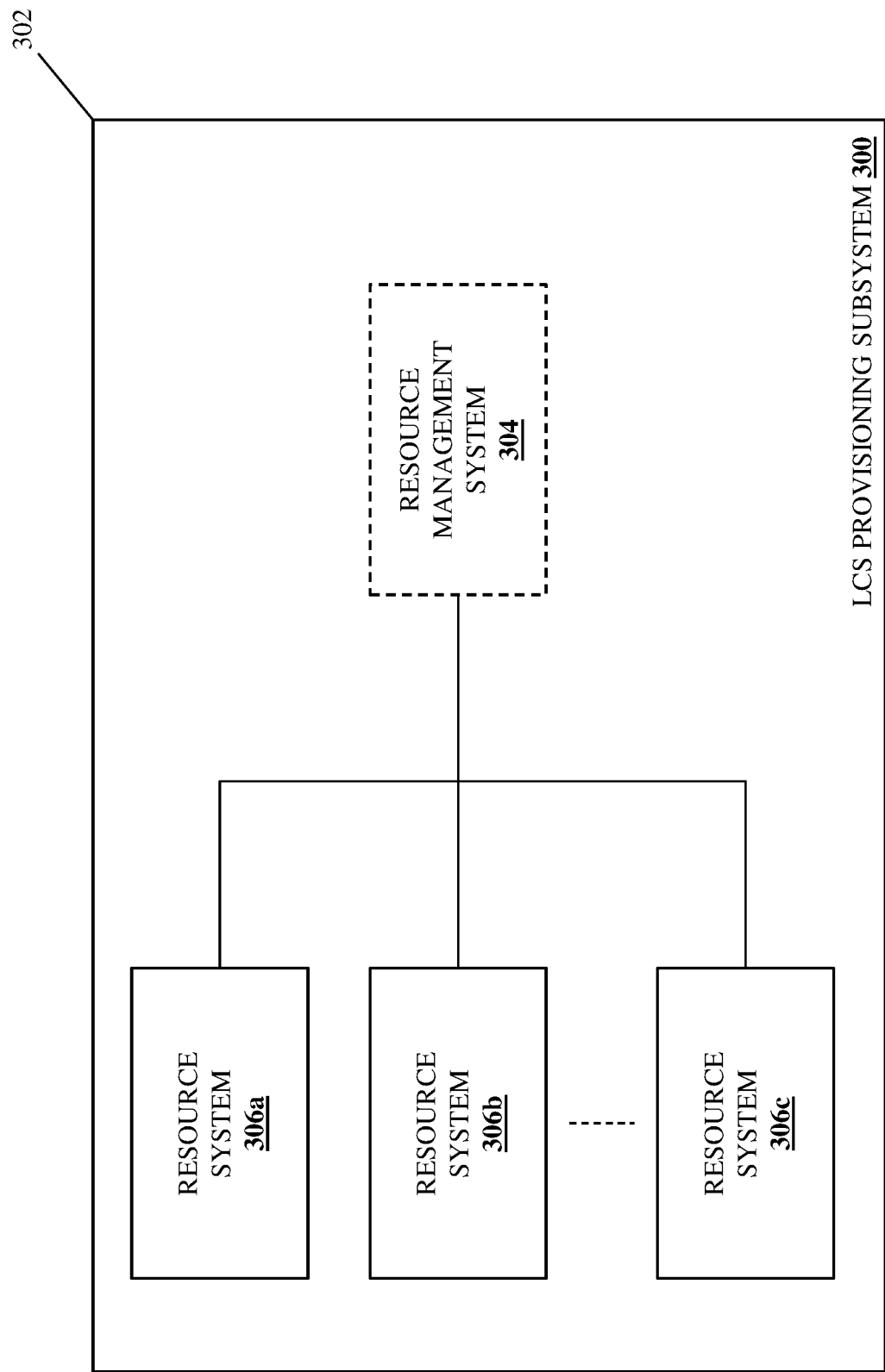
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, which may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
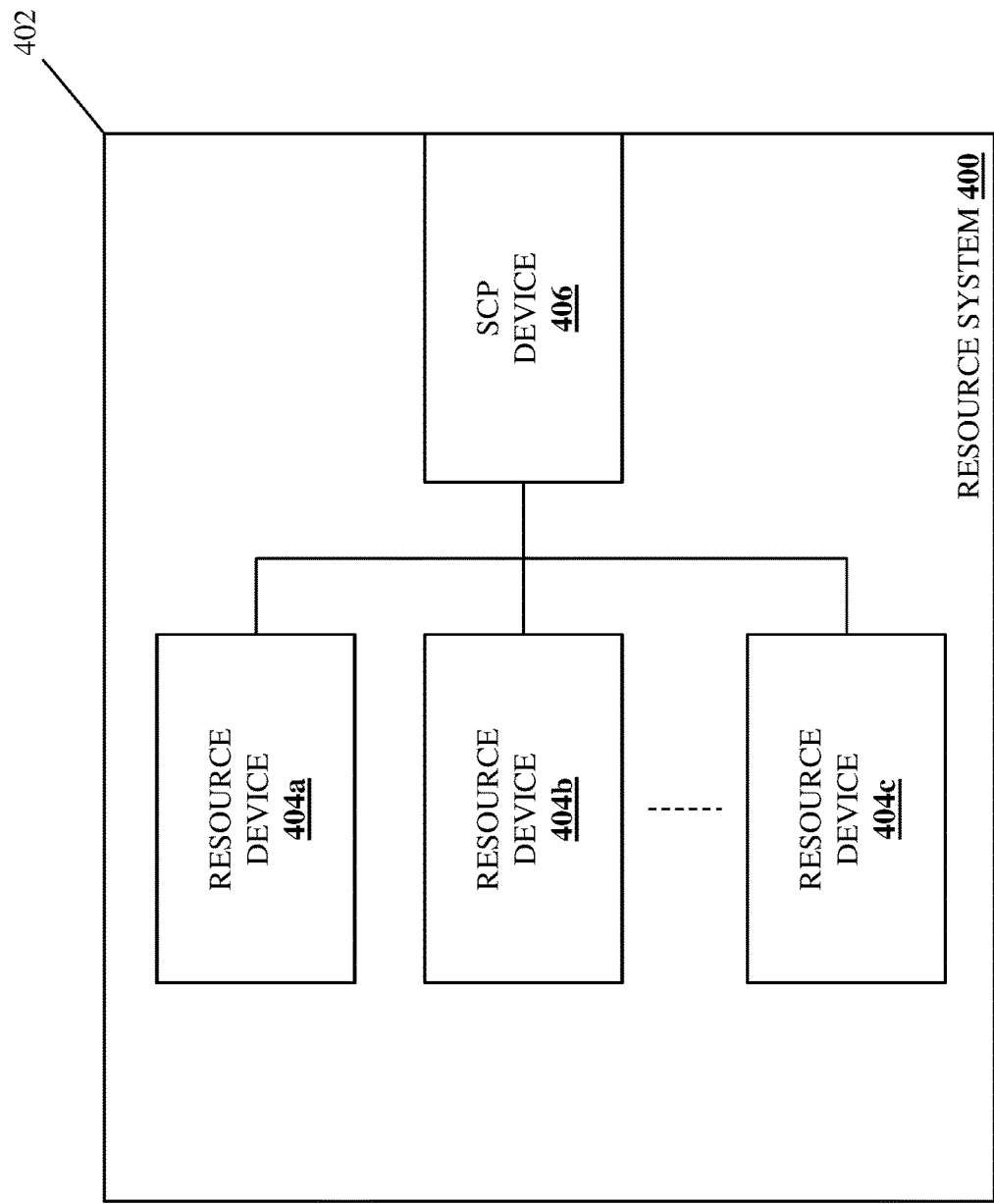
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. For example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), it having not been secured based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (IO) card that uses firmware configured to provide dedicated I/O and management functions, as in addition to firmware, the DPU device software stack will include a DPU operating system and a user space that is customizable to configure/program the DPU device to present resource devices to an operating system in the computing system 202 outside the control of the manufacturer of the computing system, which can render that DPU device "untrusted" in many scenarios.

As discussed below, the SCP devices and/or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. Thus, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
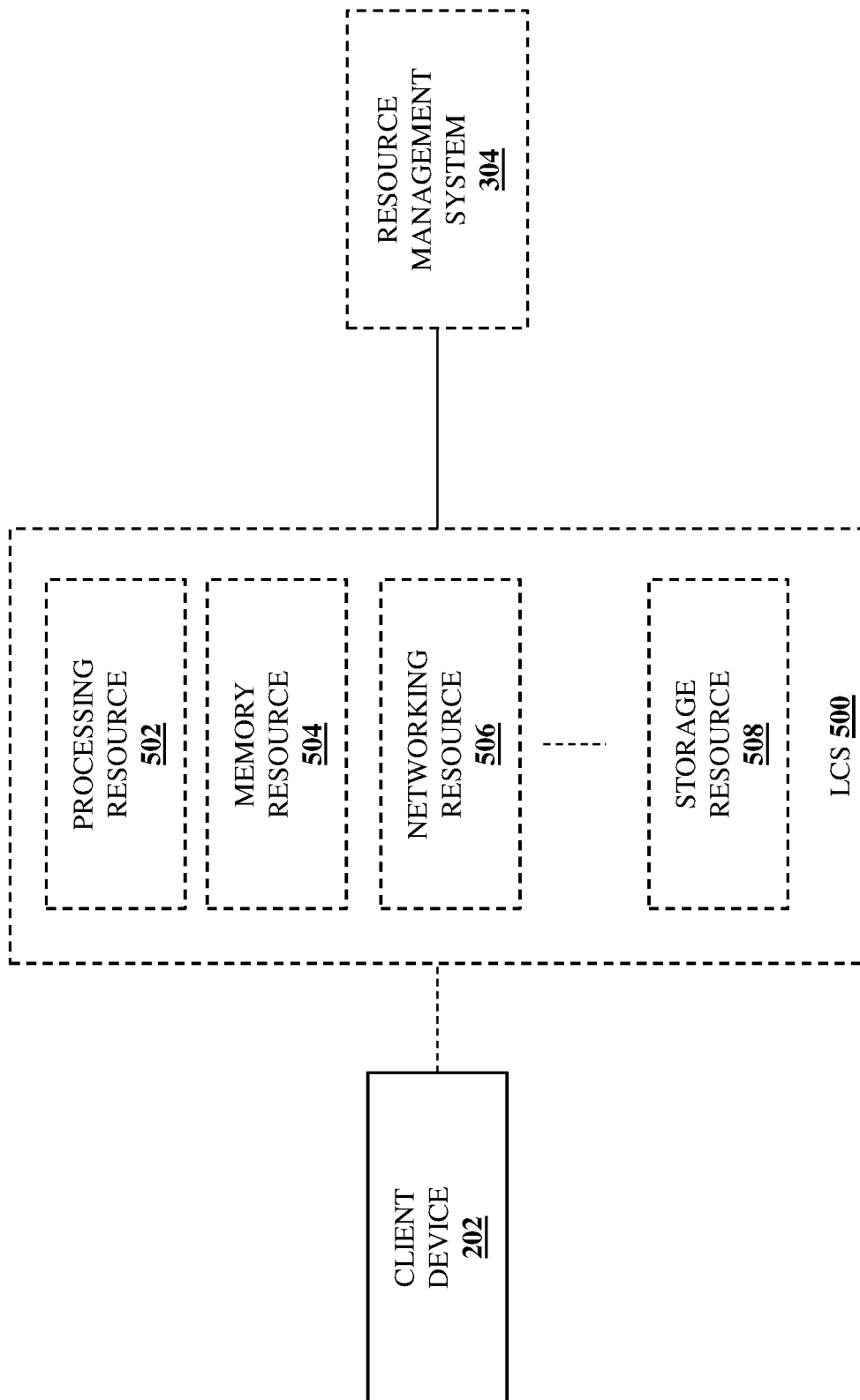
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
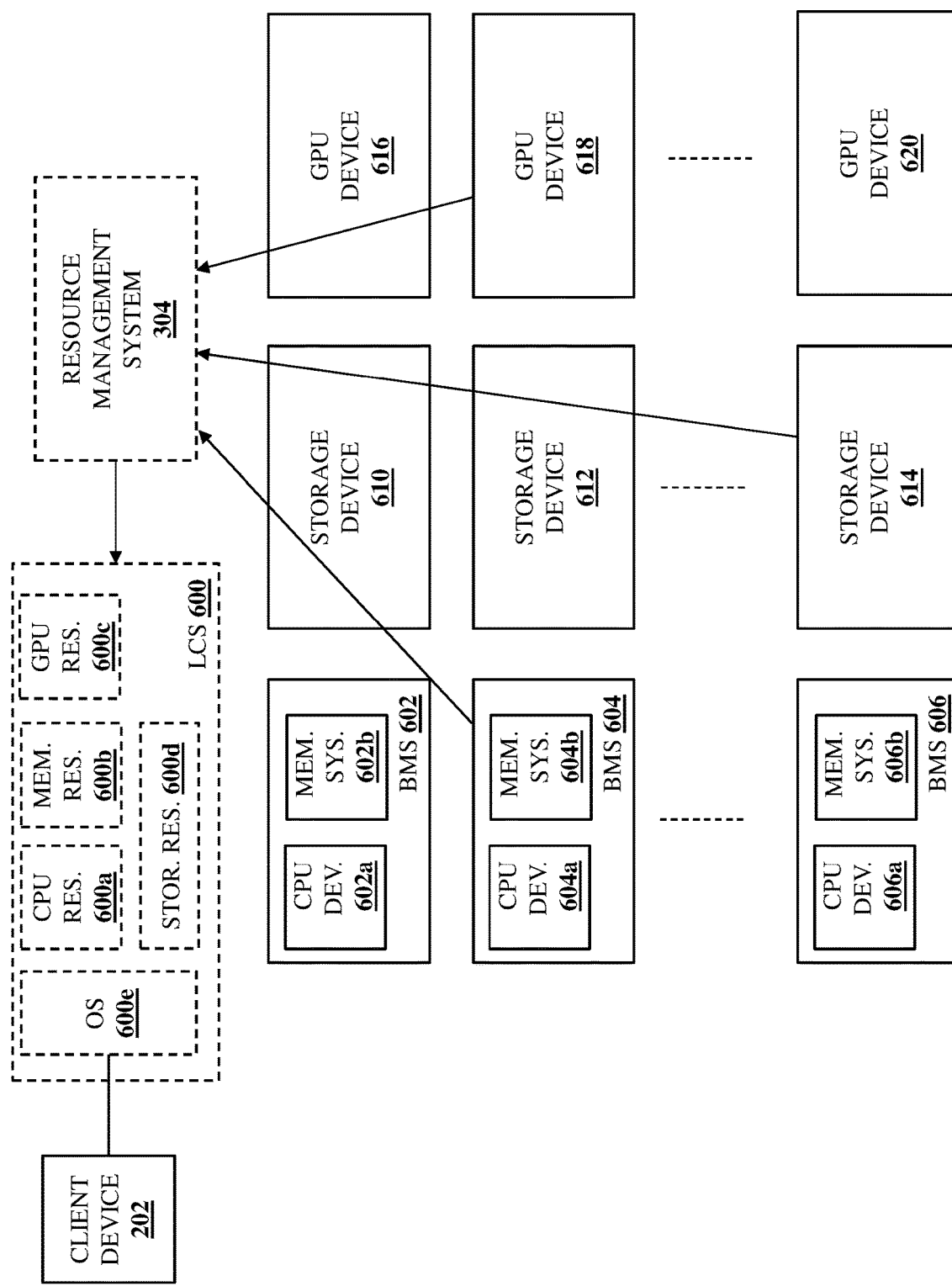
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being under-utilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
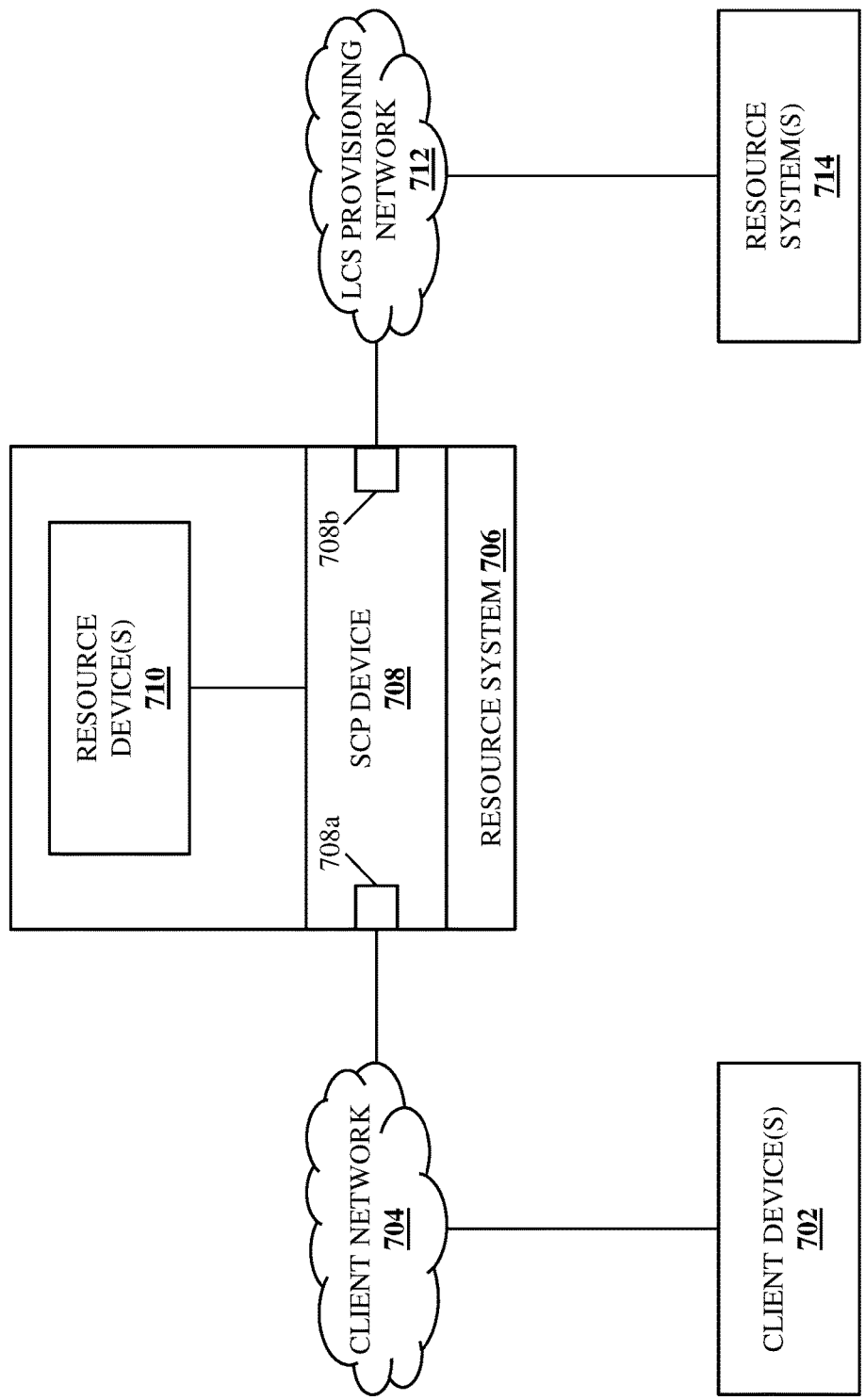
FIG. 7 is a schematic view illustrating an embodiment of a client-isolation internal/external fabric LCS provisioning system provided according to the teachings of the present disclosure.

Referring now to FIG. 7, an embodiment of a client isolation internal/external fabric LCS provisioning system 700 provided according to the teachings of the present disclosure is illustrated. In the illustrated embodiment, the client isolation internal/external fabric LCS provisioning system 700 includes one or more client devices 702 that may be provided by the client devices 202 discussed above. As such, the client device 702 may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 702 discussed below may be provided by other computing devices that are configured to operate similarly as the client device(s) 702 discussed below, and that one of skill in the art in possession of the present disclosure would recognize as utilizing the LCSs described herein.

In the illustrated embodiment, the client device(s) 702 are coupled to a client network 704 that may be provided by a Local Area Network (LAN), the Internet, combinations thereof, and/or any other networks that would be apparent to one of skill in the art in possession of the present disclosure. The client isolation internal/external fabric LCS provisioning system 700 also includes a resource system 706 that may be provided by any of the resource systems 306a-306c and/or 400 discussed above. As such, the resource system 706 may be provided by the IHS 100 discussed above with reference to FIG. 1 and/or may include some or all of the components of the IHS 100, and in specific examples may be provided by a BMS system and/or any of the other resources systems described herein. In the illustrated embodiment, the resource system 706 includes an SCP device 708, although one of skill in the art in possession of the present disclosure will appreciate how the SCP device 708 may be replaced by the DPU devices described above while remaining within the scope of the present disclosure as well. In the illustrated embodiment, the SCP device 708 include networking connections 708a (e.g., data ports) that are coupled to the client network 704, and networking connections 708b (e.g., data ports) that are coupled to an LCS provisioning network 712, discussed in further detail below. Similarly as described above, the resource system 706 includes one or more resource device(s) 710, which one of skill in the art in possession of the present disclosure will recognize may be provided by the resource devices 404a-404c, the SCP device 708, and/or any of the other resource devices described herein.

The client isolation internal/external fabric LCS provisioning system 700 also includes one or more resource systems 714 that are coupled to the LCS provisioning network 712 that may be provided by a Local Area Network (LAN), the Internet, combinations thereof, and/or any other networks that would be apparent to one of skill in the art in possession of the present disclosure. As will be appreciated by one of skill in the art in possession of the present disclosure, the resource systems 714 may be provided by the IHS 100 discussed above with reference to FIG. 1 and/or may include some or all of the components of the IHS 100, and in specific examples may be provided by a BMS system and/or any of the other resources systems described herein.

As will be appreciated by one of skill in the art in possession of the present disclosure, the client isolation internal/external fabric LCS provisioning system 700 illustrated in FIG. 7 provides a specific embodiment of how the LCS provisioning systems of the present disclosure may be configured to provide an LCS to a client device. For example, and as described in further detail below, the SCP device 708 in a BMS system provided by the resource system 706 may operate as the orchestrator device discussed above to utilize its resource device(s) 710 and/or the resource device(s) 714 coupled to the LCS provisioning network 712 in order to provide an LCS to one of the client device(s) 702 (e.g., based on a workload intent expressed by that client device 702 as discussed above). Furthermore, in the illustrated embodiment, the SCP device 708 includes the networking device/networking connections 708a that couple to the client device(s) 702 via the client network 704, and the networking device/networking connections 708b that couple to the resource system(s) 714 via the LCS provisioning network 712. However, as described above, the client isolation internal/external fabric LCS provisioning system illustrated in FIG. 7 provides but one example of a variety of possible configurations for providing an LCS to the client device(s) 702. For example, rather than including the networking device/networking connections 708a and 708b, the SCP device 708 may instead be coupled to the networking device(s) that include the networking connections 708a and 708b. As such, while a specific example is illustrated and described below, one of skill in the art in possession of the present disclosure will appreciate how LCSs may be provided in a variety of other manners while remaining within the scope of the present disclosure as well.

As discussed below, the SCP device 708 may be configured to separate an external fabric accessible via the client network 704 from an internal fabric that allows access to the LCS provisioning network 712, while providing resource devices and/or their services/functions for use by the LCS and brokering LCS-enabled instructions for those resource devices and/or services/functions in a manner that bridges the external and internal fabric without knowledge of the client device(s) 702. As such, the SCP device 708 may employ any of a variety of techniques for isolating and/or separating the external and internal fabrics described below with regard to data flows, resource utilization, and/or other factors that would be apparent to one of skill in the art in possession of the present disclosure.

As will be appreciated by one of skill in the art in possession of the present disclosure, the client network 704 and the LCS provisioning network 712 may be provided by physically separate networks, either vu networking connections (e.g., data ports) physically located on the SCP device 708 as illustrated in FIG. 7, or via networking devices coupled to and under the control of the SCP device 708. Each of the client network 704 and its associated external fabric (discussed below), and the LCS provisioning network 712 and its associated internal fabric (discussed below), may be virtualized (at least in part) via a network virtualization layer included in the SCP device 708, with the SCP device 708 operating to "stitch" together the virtualized LCS provisioning network 712 and the virtualized client network 704 to allow for the receiving of LCS communications from the client device 712 and transmission of instructions to the resource devices as discussed below. As such, one of skill in the art in possession of the present disclosure will appreciate how the virtualized LCS provisioning network 712 and its associated internal fabric may only be available to authorized subsystems in the SCP device 708 in order to, for example, isolate the internal fabric from the external fabric, while the virtualized client network 704 and its associated external fabric may not be visible to any non-network-related subsystems in the SCP device 708 in order to, for example, isolate the external fabric from the internal fabric. However, while client network 704/external fabric virtualization is described, one of skill in the art in possession of the present disclosure will appreciate how the SCP device 708 may instead operate to map the client network 704 and its associated external fabric to any LCS provided to a client device 702 in order to accomplish similar functionality while remaining within the scope of the present disclosure as well.

In some embodiments, an SCPM device may operate as discussed above to manage the configuration of the client network 704 and the LCS provisioning network 712 for use in providing LCS(s) to the client device(s) 702, and may do so using common Application Programming Interfaces (APIs) and/or data models that are available to the SCP device 708, which one of skill in the art in possession of the present disclosure will appreciate may allow for any underlying networking virtualization technology and/or networking services (e.g., LINUX® kernel networking, open-source network virtualization, SONIC® networking, etc.) to be extended and/or replaced over time if needed.

Referring now to FIG. 8, an embodiment of a method 800 for isolating clients via internal/external fabrics when providing a Logically Composed System (LCS) is illustrated. As discussed below, the systems and methods of the present disclosure provide for the isolation of an internal fabric, which is connected via a client network to a client device, and an external fabric, which is connected to an LCS provisioning network, when provisioning an LCS to the client device. For example, the client-isolation internal/external fabric LCS provisioning system of the present disclosure may include an orchestrator device coupled to a client device via an external fabric, and coupled to resource devices via an internal fabric that is not accessible to the client device via the external fabric. The orchestrator device configures the resource devices to communicate with each other in a manner that satisfies a workload intent for a workload requested by the client device, and presents an LCS provided using the configured resource devices to the client device via the external fabric. When the orchestrator device receives LCS communication(s) directed to the LCS from the client device via the external fabric, it provides instruction(s) to at least one of the resource devices via the internal fabric that are based on the LCS communication and that are configured to cause the at least one of the resource devices to perform function(s) for the LCS.

As such, LCSs may be provided based on workload intents for client devices using any of a variety of resource devices and/or their services that may be exposed to an operating system provided for the LCS via an orchestrator device such as an SCP device or DPU device while isolating that client device from the internal fabric/LCS provisioning network that is utilized to access and provide those resource devices and/or their services. As described herein, the orchestrator device may operate to manage multiple resource devices/LCS elements based on the workload intent for the client device, while optimizing the use of the orchestrator device, the LCS provisioning network, the resource devices included in and accessible outside of a BMS system being used to provide the LCS, in order to provide LCS operations to the client device in a manner that appears to the client device to be coming from a local, integrated system. As discussed below, the orchestrator device may also generate physical functions and/or virtual functions to enable the LCS, enforce any rules associated with the LCS, and/or provide any of the functionality described below, and may enable Quality of Service (QoS) requirements, offload service provisioning, and/or perform other functionality via the internal fabric in order to separate/isolate the client device from viewing and/or being able to modify resource devices that are being used to provide the LCS and that are only accessible via the internal fabric. As such, the orchestrator device may operate as a single point of control/connection between the external fabric that is used to communicate with the client device, and the external fabric that is used to provision the LCS, while operating to manage resource device/service states, enforce rules that govern data traffic flow, and separately manage the different physical networking connections/ports that provide access to the external fabric and the internal fabric in order to ensure the client device/resource device isolation discussed above.

The method 800 begins at block 802 where an orchestrator device configures resource device(s) to satisfy a workload intent for a workload requested by a client device. With reference to FIG. 7, in an embodiment of block 802, the SCP device 708 may operate to configure the resource device(s) 710 in the resource system 706, as well as resource device(s) in the resource system(s) 714, to satisfy a workload intent for a workload requested by the client device 702. As discussed above, one of the client device(s) 702 may provide a workload intent for a workload to a resource management system 304 (e.g., an SCPM device), and that resource management system 304 may then compose an LCS to satisfy that workload intent. As such, in the specific example provided herein, the resource management system 304 may select the SCP device 708 in the resource system 706, along with the resource device(s) 710 (e.g., a processing system, a memory system, etc.) in the resource system 706 (e.g., a BMS system) and the resource device(s) 714, to provide that LCS.

Figure 9A:
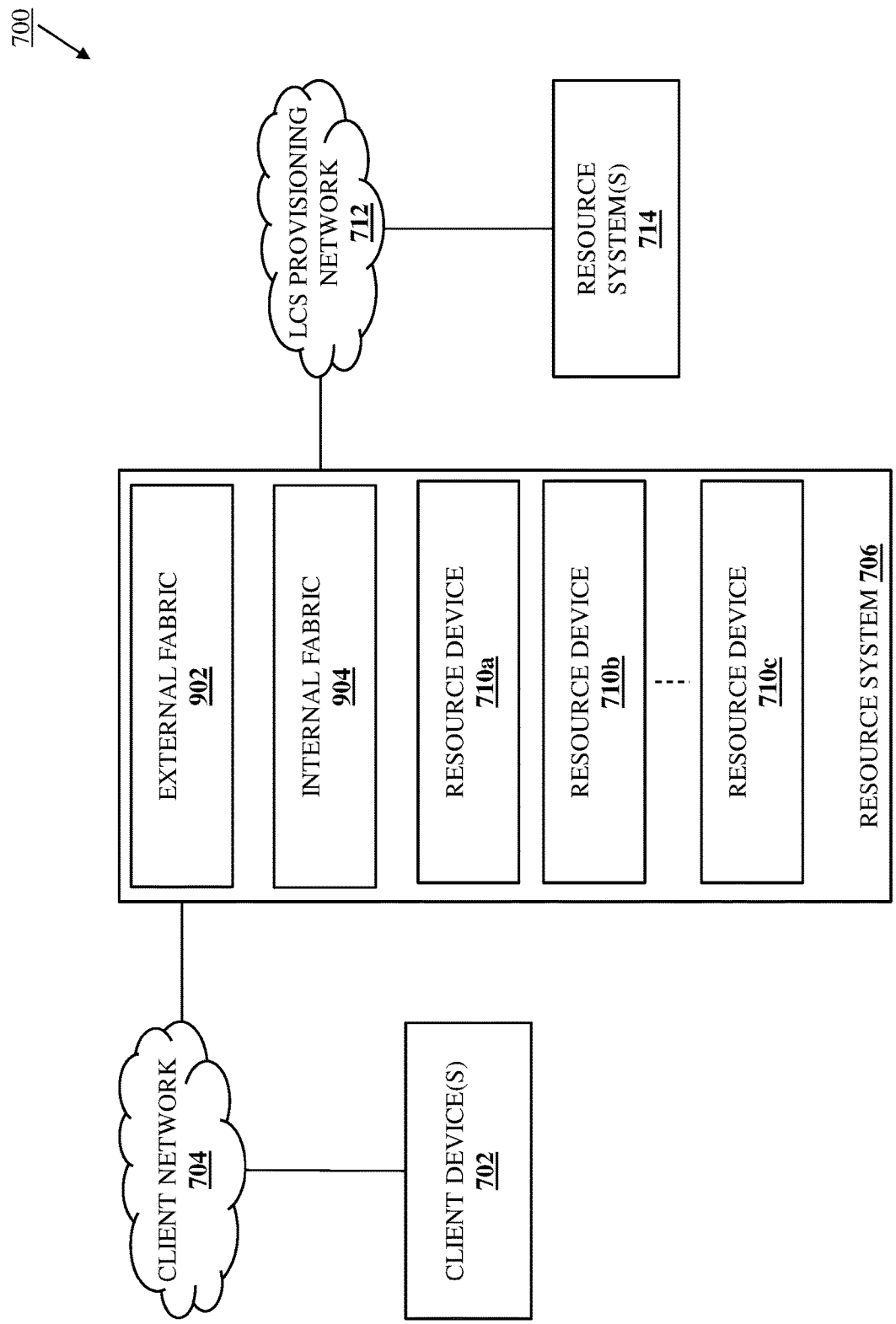
FIG. 9A is a schematic view illustrating an embodiment of the client-isolation internal/external fabric LCS provisioning system of FIG. 7 operating during the method of FIG. 8.

With reference to FIG. 9A, in an embodiment of block 802 and in response to being selected by the resource management system 304 to provide the LCS for the client device 702, the SCP device 708 may configure an external fabric 902 that may include the network connection(s) 708a (e.g., data port(s)) on the SCP device 708 (as well as other fabric components) that couple the SCP device 708 to the client device 702 via the client network 704, as well as an internal fabric 904 that may include fabric components that couple the SCP device 708 to resource devices 710a, 710b, and up to 710c in the resource system 706, as well as the network connection(s) 708b (e.g., data port(s)) on the SCP device 708 (as well as other fabric components) that couple the SCP device 708 to the resource system(s) 704 via the LCS provisioning network 712.

Furthermore, at block 802, the SCP device 708 may operate to configure the resource devices 710a, 710b, and up to 710c in the resource system 706, and the resource device(s) in the resource system(s) 714 to communicate with each other in a manner that satisfies the workload intent for the workload requested by the client device 702. As such, the SCP device 708 may apply any configurations to the resource devices 710a, 710b, and up to 710c in the resource system 706, and the resource device(s) in the resource system(s) 714, in order to enable those resource devices to perform the functionality for the LCS described below. Furthermore, as discussed below, the resource device(s) utilized to provide an LCS for a workload may change over time, and one of skill in the art in possession of the present disclosure will appreciate how the SCP device 708 may operate to reconfigure changing sets of resource devices to communicate with each other in a manner that satisfies the workload intent for the workload requested by the client device 702 as the resources devices that are used to provide the LCS change.

As discussed above, the example provided herein and illustrated in FIG. 9A is a simplified example in which the LCS is composed using a BMS system (provided by the resource system 706) that includes a processing system and memory system (provided by the resource device(s) 710a-710c) that provide an operating system for the LCS, as well as an SCP device 708 that both performs orchestration operations for the LCS and provides the networking connections to the client network 704 and the LCS provisioning network 712, with resource device(s) in that BMS system (provided by the resource device(s) 710a-710c) and outside that BMS system (e.g., provided by resource device(s) in the resource system(s) 714) used for provide any of a variety of functionality for that LCS. However, one of skill in the art in possession of the present disclosure will appreciate how the LCS provided for the client device may be composed from any combination of resource system(s), resource device(s), and orchestrator device(s), and the composition of that LCS may dynamically change as resource device operations change, as LCS requirements change, and/or in response to other dynamic LCS provisioning factors that would be apparent to one of skill in the art in possession of the present disclosure.

Figure 9B:
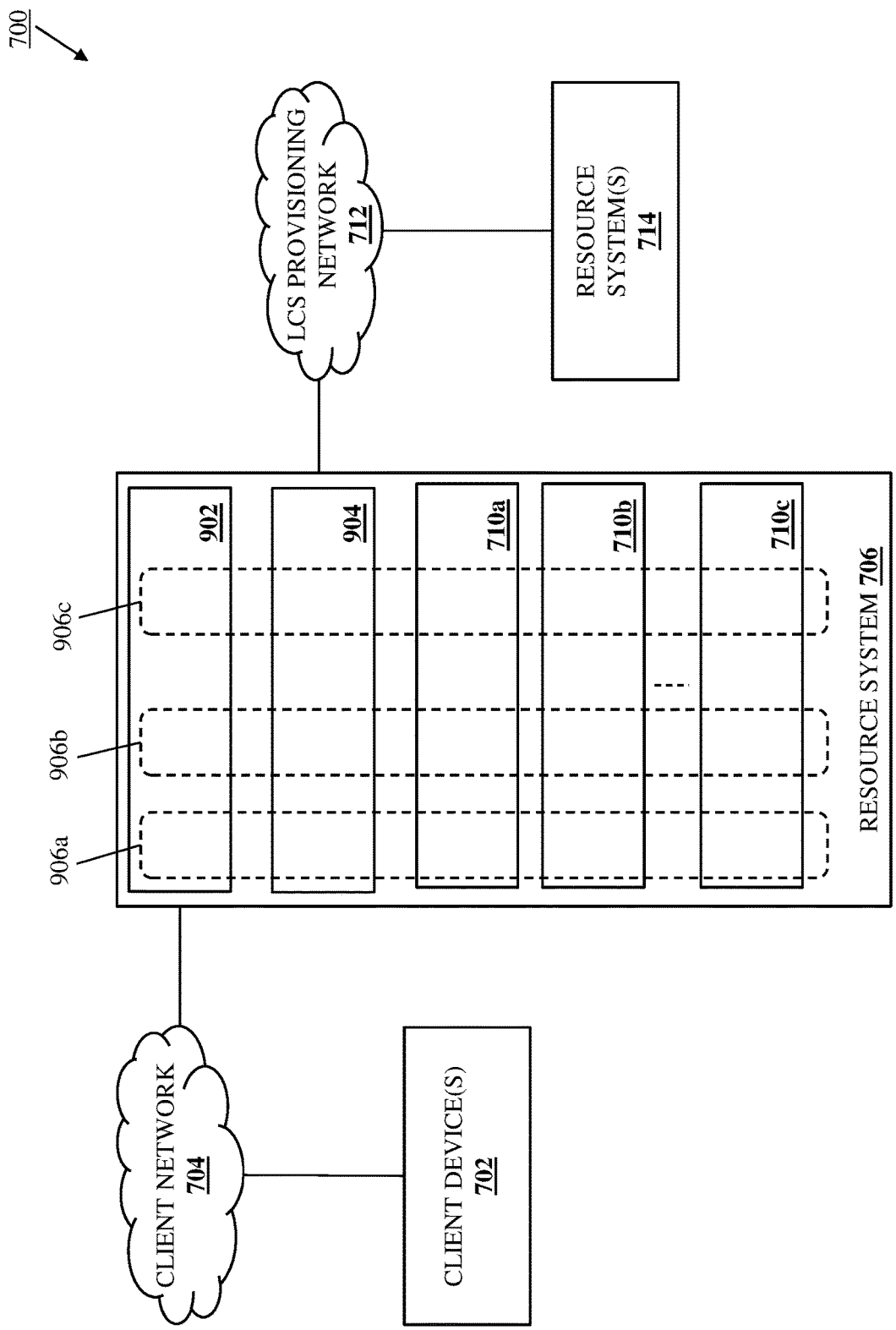
FIG. 9B is a schematic view illustrating an embodiment of the client-isolation internal/external fabric LCS provisioning system of FIG. 7 operating during the method of FIG. 8.

The method 800 then proceeds to block 804 where the orchestrator device presents an LCS provided by the resource device(s) to the client device via an external fabric. With reference to FIG. 9B, in an embodiment of block 804, the SCP device 708 may present a LCS 906a to the client device 702 via the client network 704, which as discussed above is illustrated as being provided by the resource devices 710a-710c in the resource system 706, and resource device(s) in the resource system(s) 714. Furthermore, the specific example in FIG. 9B illustrates how the SCP device 708 may also provide other LCSs 906b and up to 906c to other client devices 702 using at least the resource devices 710a-710c, and in many cases resource device(s) in the resource system(s) 714 as well. As such, one of skill in the art in possession of the present disclosure will appreciate how the LCS 906a provided herein to the client device 702 via particular resource devices may be one of a plurality of LCSs that may be provided to any number of client devices using those resource devices as well. However, one of skill in the art in possession of the present disclosure will appreciate how FIG. 9B provides just one example of the provisioning of LCSs, and how LCSs may be provided in different manners (e.g., by dedicated resource devices/resource systems) while remaining within the scope of the present disclosure as well.

In an embodiment, the provisioning of the LCS 906a to the client device 702 may include the SCP device 708 presenting the LCS 906a to the client device 702 via the external fabric 902 using the network connection(s) 708a on the SCP device 708. However, while illustrated and described as being presented via networking connection(s) on the SCP device 708, the LCS 906a may be presented to the client device 702 via networking connection(s) on at least one of the plurality of resource devices 710a-710c (or the resource device(s) in the resource system(s) 714) that are controlled by the SCP device 708 while remaining within the scope of the present disclosure as well. In a specific example, the SCP device 708 may present the network connection(s) 708a to the client device 702 as a native network connection on the LCS 906a, which one of skill in the art in possession of the present disclosure will appreciate may result in the client device 702 viewing the LCS 906a as a locally-connected, integrated system (e.g., locally connected via a LAN or other network that provides the client network 704).

Figure 10:
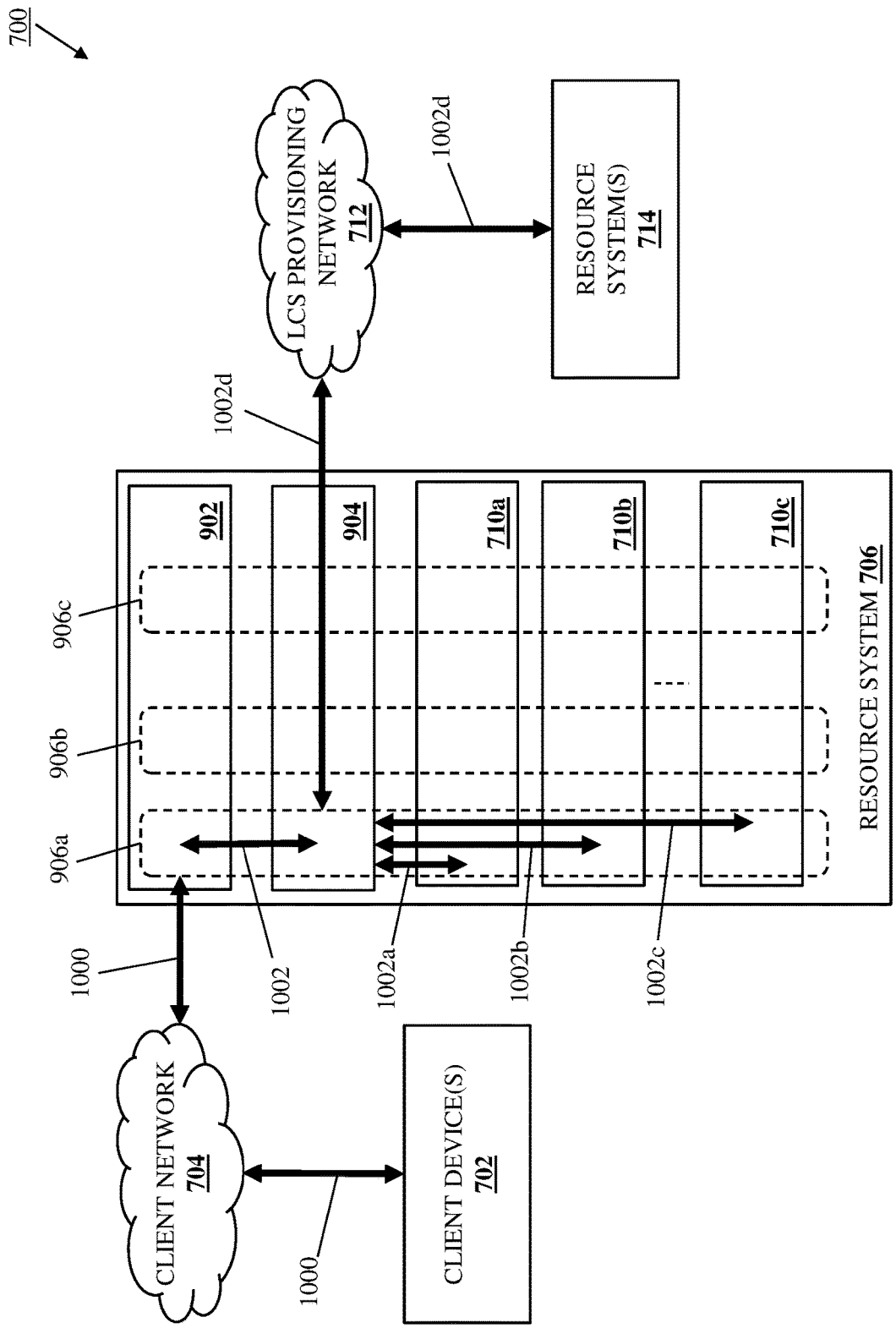
FIG. 10 is a schematic view illustrating an embodiment of the client-isolation internal/external fabric LCS provisioning system of FIG. 7 operating during the method of FIG. 8.

The method 800 then proceeds to block 806 where the orchestrator device receives LCS communication(s) directed to the LCS from the client device via the external fabric. With reference to FIG. 10, in an embodiment of block 806, the client device 702 may perform LCS communication transmission operations 1000 that may include transmitting LCS communication(s) via the client network 704 and to the external fabric 902 provided by the SCP device 708 in the resource system 706. As discussed above, the LCS communications transmitted by the client device 702 may be, from the perspective of the client device 702, "local" LCS communications that are transmitted to a native network connection on the LCS 706a that is coupled to the client network 704 and handled by that LCS 906a that appears as a locally-connected integrated system to the client device 702.

However, as described herein, the LCS communications received from the client device 702 at block 806 are handled by the SCP device 708 in order to have the LCS perform any functionality requested in those LCS communication. In an embodiment, the handling of the LCS communications from the client device 702 in such a manner may be accomplished, at least in part, by the SCP device 708 presenting the external fabric 902 and the internal fabric 904 (e.g., the networking connection(s) 708a and 708b on the SCP device 708 or on a networking device controlled by the SCP device 708) as physical or virtual networking functions to the operating system that is providing the LCS 906a. For example, the network connection(s) 708a on the SCP device 708 that provide at least part of the external fabric 902 may be presented to the operating system that provides the LCS 906a as physical or virtual Peripheral Component Interconnect express (PCIe) networking function(s) that are connected to the client network 704. Similarly, the network connection(s) 708b on the SCP device 708 that provide at least part of the internal fabric 904 may be presented to the operating system that provides the LCS 906a as physical or virtual PCIe networking function(s) that are connected to the LCS provisioning network 712.

As such, at block 806, the SCP device 708 may receive the LCS communications from the client device 702 via the external fabric 902 and may provide those LCS communications to the operating system that provides the LCS 906a via the networking function(s) presented for the external fabric 902 as discussed above, and the operating system provided the LCS 906a may then perform instruction provisioning operations 1002 that include providing instructions based on those LCS communications via the networking function(s) presented for the internal fabric 904 as discussed above, resulting in those instructions being received by the SCP device 708. As will be appreciated by one of skill in the art in possession of the present disclosure, in some examples, the instructions based on the LCS communications received from the client device 702 may be the same as the LCS communications (e.g., the LCS communications may convey the instructions provided by the operating system), while in other examples the instructions based on the LCS communications received from the client device 702 may generated using the LCS communications (e.g., the operating system may generate the instructions based on the LCS communications), and thus any of a variety of LCS communications/instructions will fall within the scope of the present disclosure.

Thus, the presentation of the external fabric 902 and the internal fabric 904 as networking functions to the operating system that provides the LCS 906a allows that operating system to receive the LCS communications from the client device 702 via the SCP device 708 and one of those networking functions presented by the SCP device 708, as well as provide corresponding instructions via another one of those networking functions presented by the SCP device 708. However, while the receiving of the LCS communications and the provisioning of the instructions via the networking functions presented as the external fabric 902 and internal fabric 904 may appear to the operating system that provides the LCS 906a as network transmissions, one of skill in the art in possession of the present disclosure will recognize that the SCP device 708 presenting the networking functions as the external fabric 902 may receive the LCS communications from the client device 702 via the client network 704 and its networking connection(s) 708a and provide them to the operating system, as well as receive the instructions from the operating system and transmit them via the internal fabric 904 (e.g., its networking connection(s) 708b) to the resource device that is configured to satisfy the LCS communications/execute the instructions. However, while specific SCP device/operating system interactions are describes as being performed to receive LCS communications and provide corresponding instructions, one of skill in the art in possession of the present disclosure will appreciate how the LCS communications may be received, and the corresponding instructions may be provided, in other manners that will fall within the scope of the present disclosure as well.

The method 800 then proceeds to block 808 where the orchestrator device provides instruction(s) based on the LCS communication(s) to the resource device(s) via an internal fabric that is not accessible to the client device via the external fabric. With continued reference to FIG. 10, in an embodiment of block 808, the SCP device 708 may perform instruction provisioning operations 1002a that include transmitting any instruction(s) via the internal fabric 904 and to the resource device 710a in the resource system 706 that is configured to perform those instructions. Similarly, in an embodiment of block 808, the SCP device 708 may perform instruction provisioning operations 1002b that include transmitting any instruction(s) via the internal fabric 904 and to the resource device 710b in the resource system 706 that is configured to perform those instructions. Similarly, in an embodiment of block 808, the SCP device 708 may perform instruction provisioning operations 1002c that include transmitting any instruction(s) via the internal fabric 904 and to the resource device 710c in the resource system 706 that is configured to perform those instructions. Similarly, in an embodiment of block 808, the SCP device 708 may perform instruction provisioning operations 1002d that include transmitting any instruction(s) via the internal fabric 904, through the LCS provisioning network 712, and to resource device(s) in the resource system(s) 714 that are configured to perform those instructions.

In a specific example, the instruction provisioning operations 1002a, 1002b, 1002c, and/or 1002d may be performed by the SCP device 708 by tunneling LCS communications and/or instructions received from the client device 702 to the resource device that is configured to satisfy/perform them. As such, the SCP device 708 may receive LCS communications and/or instructions and perform the instruction provisioning operations 1002a by tunneling those LCS communications and/or instructions to the resource device 710a in the resource system 706. Similarly, the SCP device 708 may receive LCS communications and/or instructions and perform the instruction provisioning operations 1002b by tunneling those LCS communications and/or instructions to the resource device 710b in the resource system 706. Similarly, the SCP device 708 may receive LCS communications and/or instructions and perform the instruction provisioning operations 1002c by tunneling those LCS communications and/or instructions to the resource device 710c in the resource system 706. Similarly, the SCP device 708 may receive LCS communications and/or instructions and perform the instruction provisioning operations 1002d by tunneling those LCS communications and/or instructions through the LCS provisioning network 712 and to resource device(s) in the resource system(s) 714.

As will be appreciated by one of skill in the art in possession of the present disclosure, then provisioning of the instructions to the resource device(s) that provide the LCS 906a via the internal fabric 904 as discussed above will be hidden from the client device 702, which as discussed above is presented the LCS 906a via the external fabric 902 and, in some embodiments, as connected to the client device 702 via a native networking connection on the LCS 906a that is provided by the external fabric 902 (e.g., the networking connection(s) 708a on the SCP device 708). Furthermore, the presentation of the external fabric 902 and the internal fabric 904 as networking functions to the operating system providing the LCS 906a further isolates the LCS 906a presented to the client device 702 and the functionality performed by the resource devices that provide that LCS 906a, as that operating system may receive LCS communications via one of those networking functions and provide corresponding instructions via another of those networking functions, and with the SCP device 708 then operating in a manner that is hidden from that operating system in order to provide those instructions to the resource devices that are configured to perform them. Thus, one of skill in the art in possession of the present disclosure will appreciate how the internal fabric 904 is inaccessible to the client device 702 via the external fabric 702 to which it has access, thus accomplishing the objective of providing the LCS 906a to the client device 702 in a manner that allows the client device to interact with that LCS 906a, but without knowledge of the resource devices and/or services that are being employed via the internal fabric 904 to provide that LCS 906a.

The method 800 then proceeds to block 810 where the resource device(s) perform function(s) for the LCS based on the instruction(s). In an embodiment, at block 810 and as discussed above, any of the resource device(s) 710a-710c and/or the resource device(s) in the resource system(s) 714 may execute the instructions provided to them as discussed above to perform any of a variety of functions for the LCS 906a. As such, one of skill in the art in possession of the present disclosure will appreciate how the client device 702 may utilize the LCS 906a (e.g., via the LCS communications discussed above) in order to have the LCS 906a (i.e., the resource device(s) 710a-710c and/or the resource device(s) in the resource system(s) 714) perform any desired functionality.

Furthermore, as discussed above, any of the resource device(s) 710a-710c and/or the resource device(s) in the resource system(s) 714 that are being used to provide the LCS 906a may change in a manner that is hidden from the client device 702. For example, a GPU device being used to provide the LCS 906a may become insufficient to perform the workload requested by the client device 702 and, in response, a different GPU device may be identified (e.g., by the SCPM device discussed above) and used to provide the LCS 906a, with the GPU device "hand-off" performed by combinations of the SCPM device discussed above and the SCP device 708 in a manner that is hidden from the client device 702, and that allows continued performance of the workload requested by the client device 702 such that the GPU device change provides little (or no) impact on the performance of that workload. However, while modification of a particular resource device that is providing an LCS has been described, one of skill in the art in possession of the present disclosure will appreciate how any resource device being used to provide an LCS (e.g., including the network connection(s) on the SCP device 708) may be modified and provided by other resource devices while remaining within the scope of the present disclosure as well. As such, the client device 702 may connect to the external fabric 902 via a data port on an orchestrator device in a resource system, and then utilize an LCS that may be dynamically provided by any of a variety of resource devices that are accessible via an internal fabric 904 that is coupled to that external fabric 902 by that orchestrator device.

As will be appreciated by one of skill in the art in possession of the present disclosure, the LCS provisioning described above allows the SCP device 708 to enable the management of the lifecycle of the LCS 906a by the client device 702 without the need to provide any low level control of the resource devices that provide that LCS 906a (e.g., the ability to power-on, power-off, reset, etc. any of those resource devices). As such, the client device 702 may transmit LCS communications corresponding to life-cycle management instructions directed to the LCS 906a via the external fabric 902 and, upon receiving those life-cycle management instructions, the SCP device 708 may perform a life cycle management operation on the LCS 906a based on the life-cycle management instructions, which one of skill in the art in possession of the present disclosure will appreciate may include suspending the operation of the LCS 906a, stopping the operation of the LCS 906a, powering the LCS 906a on or off, resetting/restarting the LCS 906a, performing a firmware upgrade on the LCS 906a, coordinating logical and/or physical operations of the LCS, and/or any of a variety of life-cycle management operations that would be apparent to one of skill in the art in possession of the present disclosure.

Thus, systems and methods have been described that provide for the isolation of an internal fabric, which is connected via a client network to a client device, and an external fabric, which is connected to an LCS provisioning network, when provisioning an LCS to the client device. For example, the client-isolation internal/external fabric LCS provisioning system of the present disclosure may include an orchestrator device coupled to a client device via an external fabric, and coupled to resource devices via an internal fabric that is not accessible to the client device via the external fabric. The orchestrator device configures the resource devices to communicate with each other in a manner that satisfies a workload intent for a workload requested by the client device, and presents an LCS provided using the configured resource devices to the client device via the external fabric. When the orchestrator device receives LCS communication(s) directed to the LCS from the client device via the external fabric, it provides instruction(s) to at least one of the resource devices via the internal fabric that are based on the LCS communication and that are configured to cause the at least one of the resource devices to perform function(s) for the LCS. As such, client devices may be provided LCSs via an external network while isolating those client devices from the internal network that provides access to the resource devices used to provide that LCS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A client-isolation internal/external fabric Logically Composed System (LCS) provisioning system, comprising:
   a client device;
   a plurality of resource devices; and
   an orchestrator device that is coupled to the client device via an external fabric, and coupled to the plurality of resource devices via an internal fabric that is not accessible to the client device via the external fabric, wherein the orchestrator device is configured to:
      configure the plurality of resource devices to communicate with each other in a manner that satisfies a workload intent for a workload requested by the client device;
      present, to the client device via the external fabric, a Logically Composed System (LCS) that is provided using the plurality of resource devices that are configured to communicate with each other and that includes an operating system that is configured to access the external fabric via a first local networking function and access the internal fabric via a second local networking function that is different than the first networking function;
      receive, from the client device via the external fabric, at least one LCS communication directed to the LCS;
      provide, to the operating system included in the LCS via the first local networking function, the at least one LCS communication;
      receive, from the operating system included in the LCS via the second local networking function, at least one instruction that is based on the LCS communication and that is configured to cause the at least one of the plurality of resource devices to perform at least one function for the LCS; and
      provide, to at least one of the plurality of resource devices via the internal fabric, the at least one instruction that is based on the LCS communication.

2. The system of claim 1, wherein the orchestrator device is configured to:
   present the LCS to the client device via the external fabric using a physical network connection on at least one of the plurality of resource devices.

3. The system of claim 2, wherein the orchestrator device is configured to:
   present the physical network connection as a native network connection on the LCS.

4. The system of claim 1, wherein orchestrator device is configured to:
   provide the at least one instruction that is based on the LCS communication to the at least one of the plurality of resource devices by tunneling the LCS communication received via the external fabric to the at least one of the plurality of resource devices.

5. The system of claim 1, wherein the orchestrator device is configured to:
   present the internal fabric as the first local networking functions and the external fabric as the second local networking function to the operating system.

6. The system of claim 1, wherein the first local networking function and the second local networking function are Peripheral Component Interconnect express (PCIe) networking functions.

7. The system of claim 1, wherein the orchestrator device is configured to:
   receive, from the client device via the external fabric, at least one life-cycle management instruction directed to the LCS; and
   perform, based on the at least one life-cycle management instruction, a life cycle management operation on the LCS.

8. An Information Handling System (IHS), comprising:
   a processing system; and
   a memory system that is coupled to the processing system and that includes instructions that, when executed by the processing system, cause the processing system to provide an orchestrator engine that is configured to:
      configure a plurality of resource devices to communicate with each other in a manner that satisfies a workload intent for a workload requested by a client device;
      present, to the client device via an external fabric, a Logically Composed System (LCS) that is provided using the plurality of resource devices that are configured to communicate with each other and that includes an operating system that is configured to access the external fabric via a first local networking function and access an internal fabric that is not accessible to the client device via the external fabric via a second local networking function that is different than the first networking function;

receive, from the client device via the external fabric, at least one LCS communication directed to the LCS;

provide, to the operating system included in the LCS via the first local networking function, the at least one LCS communication;

receive, from the operating system included in the LCS via the second local networking function, at least one instruction that is based on the LCS communication and that is configured to cause the at least one of the plurality of resource devices to perform at least one function for the LCS; and provide, to at least one of the plurality of resource devices via the internal fabric, the at least one instruction that is based on the LCS communication.

9. The IHS of claim 8, wherein the orchestrator engine is configured to:

present the LCS to the client device via the external fabric using a physical network connection on at least one of the plurality of resource devices.

10. The IHS of claim 9, wherein the orchestrator engine is configured to:

present the physical network connection as a native network connection on the LCS.

11. The IHS of claim 8, wherein orchestrator engine is configured to:

provide the at least one instruction that is based on the LCS communication to the at least one of the plurality of resource devices by tunneling the LCS communication received via the external fabric to the at least one of the plurality of resource devices.

12. The IHS of claim 8, wherein the orchestrator engine is configured to:

present the internal fabric as the first local networking functions and the external fabric as the second local networking function to the operating system.

13. The IHS of claim 7, wherein the orchestrator engine is configured to:

receive, from the client device via the external fabric, at least one life-cycle management instruction directed to the LCS; and perform, based on the at least one life-cycle management instruction, a life cycle management operation on the LCS.

14. A method for isolating clients via internal/external fabrics when providing a Logically Composed System (LCS), comprising:

configuring, by an orchestrator device, a plurality of resource devices to communicate with each other in a manner that satisfies a workload intent for a workload requested by a client device;

presenting, by the orchestrator device to the client device via an external fabric, a Logically Composed System (LCS) that is provided using the plurality of resource devices that are configured to communicate with each other and that includes an operating system that is configured to access the external fabric via a first local networking function and access an internal fabric that is not accessible to the client device via the external fabric via a second local networking function that is different than the first networking function;

receiving, by the orchestrator device from the client device via the external fabric, at least one LCS communication directed to the LCS;

providing, by the orchestrator device to the operating system included in the LCS via the first local networking function, the at least one LCS communication;

receiving, by the orchestrator device from the operating system included in the LCS via the second local networking function, at least one instruction that is based on the LCS communication and that is configured to cause the at least one of the plurality of resource devices to perform at least one function for the LCS; and providing, by the orchestrator device to at least one of the plurality of resource devices via the internal fabric, the at least one instruction that is based on the LCS communication.

15. The method of claim 14, further comprising:

presenting, by the orchestrator device, the LCS to the client device via the external fabric using a physical network connection on at least one of the plurality of resource devices.

16. The method of claim 15, further comprising:

presenting, by the orchestrator device, the physical network connection as a native network connection on the LCS.

17. The method of claim 14, further comprising:

providing, by the orchestrator device, the at least one instruction that is based on the LCS communication to the at least one of the plurality of resource devices by tunneling the LCS communication received via the external fabric to the at least one of the plurality of resource devices.

18. The method of claim 14, further comprising:

presenting, by the orchestrator device, the internal fabric as the first local networking function and the external fabric as the second local networking function to the operating system.

19. The method of claim 14, wherein the first local networking function and the second local networking function are Peripheral Component Interconnect express (PCIe) networking functions.

20. The method of claim 14, further comprising:

receiving, by the orchestrator device from the client device via the external fabric, at least one life-cycle management instruction directed to the LCS; and performing, by the orchestrator device based on the at least one life-cycle management instruction, a life cycle management operation on the LCS.

* * * * *